Aug. 21, 1945.        T. HEIL        2,383,192
CONVERTIBLE UTILITY AND CAMP TRAILER AND CAMP TENT
Filed June 6, 1944        2 Sheets-Sheet 1
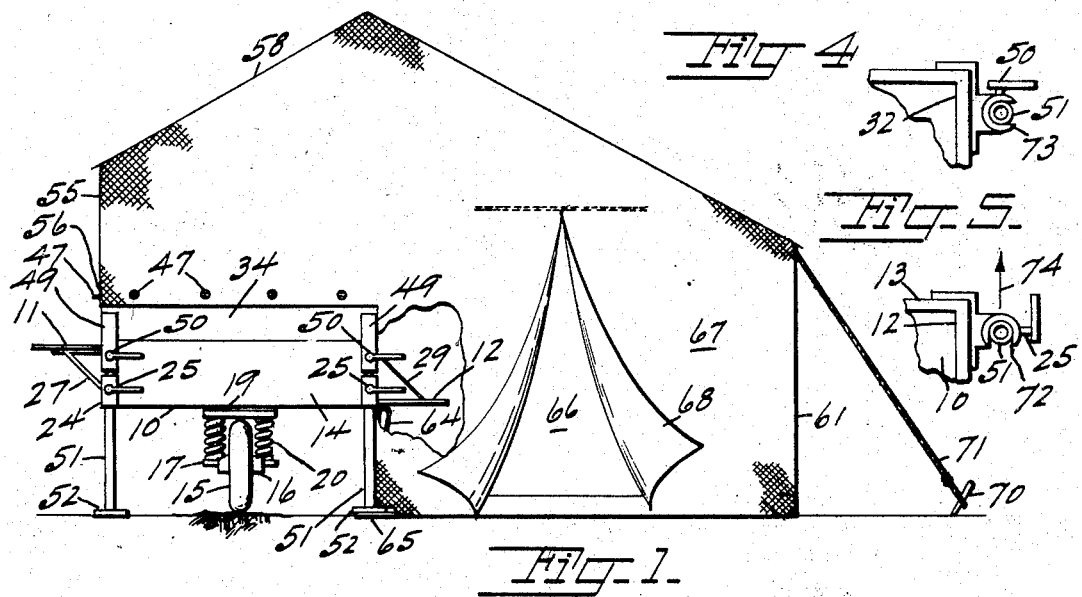
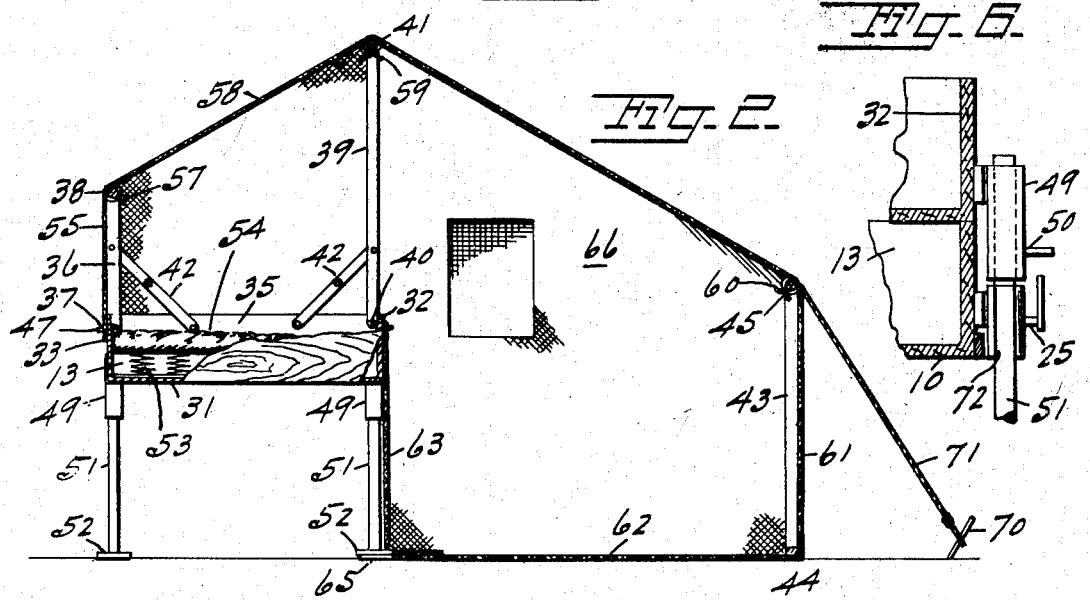
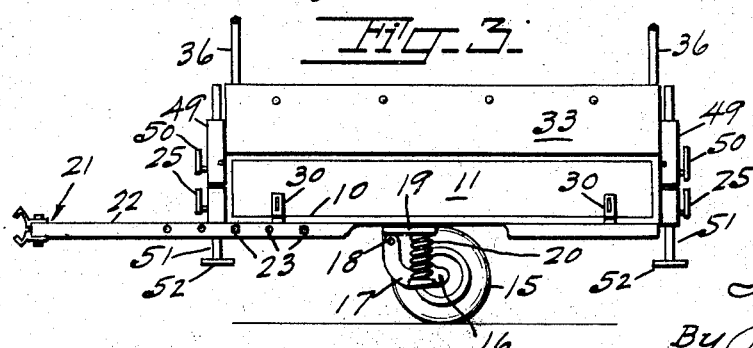
Inventor
Theodore Heil
By Philip A. Friedell
Attorney Aug. 21, 1945.  T. HEIL  2,383,192
CONVERTIBLE UTILITY AND CAMP TRAILER AND CAMP TENT
Filed June 6, 1944  2 Sheets-Sheet 2
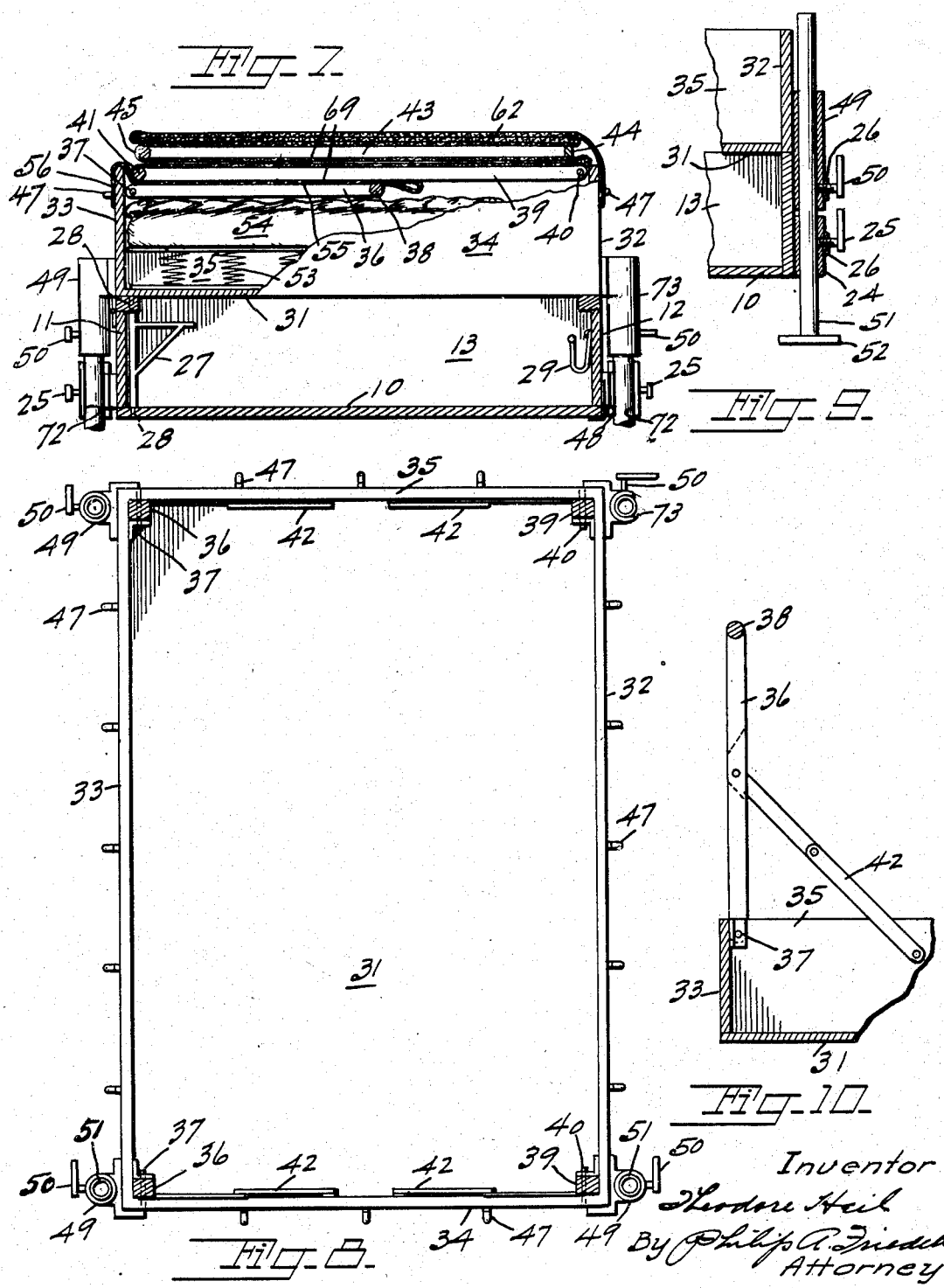

Patented Aug. 21, 1945

2,383,192

UNITED STATES PATENT OFFICE 2,383,192

CONVERTIBLE UTILITY AND CAMP TRAILER AND CAMP TENT

Theodore Heil, Berkeley, Calif.

Application June 6, 1944, Serial No. 538,919

9 Claims. (Cl. 296—23)

This invention, a convertible utility and camp trailer and camp tent is designed to supply a long-felt want for an automotive auxiliary which can be converted and used at will as a utility trailer, a camp trailer, and a camp tent, with the utility trailer and camp tent coincidently available for use. It further provides a camp trailer and tent combination which is of minimum weight, requires a minimum of space, and one which does not obstruct the rear view from the automotive vehicle, one which provides plenty of room for auxiliary camp equipment, sporting goods, food stuffs and materials, and one which can be converted into a tent ready for occupancy with a minimum of effort and time.

Conventional camp trailers are designed for only one purpose and are not convertible. The tent type is so constructed usually as to be an integral part of the trailer, sometimes consisting of a complicated arrangement of posts, poles and struts, usually being very weighty and bulky, with many loose pieces, and requiring considerable skill, time and effort to prepare the tent ready for occupancy.

This invention provides an arrangement in which the tent is very easily and quickly pitched and made ready for occupancy, either with or without the trailer, in which the bed is always made up and is supported in an elevated position, and what will be found of special interest, no skill is required.

The tent can be made in any desired size. It consists of a minimum number of parts of absolute minimum weight, and all parts including poles and struts, bed support and tent, can be made into an integral unit with no loose pieces. The unit has means for removably securing it to the utility trailer—the same means used for supporting the bed in an elevated position, therefore performing a dual purpose.

The objects and advantages of the invention are as follows:

First, to provide an automotive auxiliary which is readily convertible into a camp trailer, or into two separately usable units consisting of a utility trailer and a camp tent.

Second, to provide a camp tent which consists of a minimum number of parts and which is easily and quickly set up ready for occupancy.

Third, to provide a camp trailer which consists of a utility trailer and a removable superstructure which includes a bed ready for occupancy at all times, and a tent having one pair of side posts with their eave pole, and the center posts with their ridge pole, collapsibly secured to the superstructure, and with the other pair of side posts with their eave pole supportable in a reclined position on the superstructure, so as to require an absolute minimum of space, and requiring no skill and an absolute minimum of time and effort for pitching the tent.

Fourth, to provide an arrangement as outlined in which adjustable legs are provided for a threefold purpose; that of providing the means for immovably securing the superstructure on the utility trailer; forming legs for the four corners of the trailer and simultaneously securing the superstructure to the trailer; and for forming legs for the superstructure alone for support free of the trailer.

Fifth, to provide a utility trailer with side panels which respectively raise and lower to horizontal positions to form respectively, a shelf, and a seat or step.

Sixth, to provide a camp trailer with a superstructure and attached or attachable tent, and in which the superstructure is supportable on the top of the trailer, with the space between the bottom of the superstructure and the floor of the trailer functioning as a compartment for storage and transportation of supplies and materials, and in which the sides of the trailer are openable to provide access to the materials and supplies.

Seventh, to provide a convertible utility and camp trailer in which a superstructure is removably and securably mounted on a utility trailer and provided with a tent including side and center poles and eave and ridge poles which are collapsible or foldable with their included portions of the tent upon the superstructure, and with the remaining portion of the tent with the other support poles also supportable on the superstructure, to permit easy and rapid pitching of the tent.

Eighth, to provide an arrangement as outlined which is adaptable to trailers with one or more wheels, and even with automotive vehicles which are self-propelled.

Other objects and advantages of the invention will become apparent as the following description is read on the drawings forming a part of this specification, in which:

Fig. 1 is a front elevation of the invention shown with the superstructure supported on the trailer.

Fig. 2 is a transverse section through the invention modified from Fig. 1 to show the trailer removed and the superstructure supported on the same legs used for supporting the trailer in Fig. 1.

Fig. 3 is a side elevation of the trailer with the superstructure mounted thereon and with the tent posts fragmentarily shown.

Figs. 4, 5 and 6 fragmentarily illustrate to an enlarged scale the type of socket used to permit removal of the trailer from the pitched tent; Fig. 4 showing the leg socket which is applied to only the outer front corner of the superstructure; Fig. 5, the type of socket applied to all four corners of the trailer; and Fig. 6 a rear elevation of the assembled leg and sockets for the outer front end of the trailer and superstructure.

Fig. 7 is an enlarged transverse section through the trailer, superstructure, and tent assembly, all packed for transporting, the road wheel being eliminated to show only the body of the trailer.

Fig. 8 is a top plan view of the superstructure and illustrated with sockets which permit removal of the trailer.

Fig. 9 is a fragmentary view of one corner of the trailer body and superstructure showing the method of securing the two together to prevent accidental displacement during travel.

Fig. 10 is a fragmentary view showing one corner of the superstructure in section and the connection of one corner post with its eave or ridge pole, and a suitable method of bracing the post to support the tent.

The invention consists of a utility trailer, a superstructure, and a tent, with the superstructure removably mountable on the trailer and securable thereto, and the tent collapsible onto and extensible from the superstructure, and a bed supported within the superstructure and ready for occupancy at all times.

The trailer may be of any conventional or special type, with one, two, or more road wheels, and may even be a self-propelled vehicle, and is illustrated as consisting of the single wheel type having a body comprising bottom 10, sides 11 and 12, and ends 13 and 14; a road wheel 15 pivoted at 16 in a bracket 17 which in turn is pivoted at 18 to a fifth wheel 19, with the load being absorbed by the springs 20. A suitable hitch 21 is provided and is illustrated as consisting of shafts or bars 22 which are adjustable on the sides of the body as indicated at 23 to provide, through suitable adjustment, sufficient space between the rear of the automotive vehicle (not shown) and the front of the trailer to permit convenient access to the rear compartment of the vehicle.

Supporting and clamping means for the trailer and superstructure may consist of any suitable arrangement which will secure the superstructure against movement on the trailer, and means for firmly supporting the respective corners of the trailer and superstructure; and is shown as consisting of sections 24 of pipe having a height about equal to one-half the height of the body of the trailer, and respectively secured to the four corners. Each of these sections is threaded through one wall to receive a clamp screw 25, the threaded portion, if believed necessary, being reinforced by a suitable nut 26 as is clearly illustrated in Fig. 9 and which may be welded in place.

For convenience, and for accessibility to the interior of the body of the trailer when the superstructure is mounted thereon, the two sides of the body are made to open respectively up and down to horizontal positions as indicated in Fig. 1, the exterior side opening up and shown as supported by an angle bracket 27 which is pivoted as indicated at 28 to swing in as shown in Fig. 7 when the side is to be closed; the interior, or side toward the tent being hinged at the bottom and supported by a chain or cable 29 when lowered.

These sides thus serve as shelves, tables, steps or seats, the interior or lowered one providing a convenient step for climbing into the bed, and a seat, shelf or table, while the exterior or raised one provides a convenient shelf or table. Suitable latches 30 are provided for locking the sides in a closed position.

The superstructure consists of an open-top box-like affair having a bottom 31, sides 32 and 33, and ends 34 and 35. Considering side 33 as the exterior side, the side farthest removed from the center of the tent, a tent post 36 is collapsibly supported at its lower end in each of the respective exterior corners of the superstructure, such as by means of a socket (not shown), or as illustrated as being pivoted to the superstructure as indicated at 37. These two posts are spanned by an eave pole 38, and the posts are of such length as to provide suitable pitch to the roof of the tent, with the length less than the width of the superstructure, on the order of ½ to ¾ that width.

Similarly mounted at the corners of the interior side 32 are two center posts 39 which are shown as pivoted at 40, with a ridge pole 41 spanning the tops of the posts. These center posts are substantially equal or slightly less in length than the width of the superstructure so as to lie between the side walls, and suitable collapsible struts or braces 42 are provided for all posts so as to make this portion of the tent self-supporting.

An additional pair of tent posts 43 including a base bar or sill 44 and an eave pole 45, which respectively span the bottom and top of the posts to form a frame for the side of the tent farthest removed from the superstructure, together with suitable fixed struts, are provided, the height of the frame being substantially equal to the width, and its length being substantially equal to the length, of the superstructure. Obviously, this latter frame may be a convenience though not essential, and could readily be dispensed with, depending upon the guy ropes to suitably support that side of the tent.

Turnbuttons 47 are mounted on all sides of the superstructure, and also at the lower end of the interior side of the trailer below the shelf or seat 12 as shown at 48 in Fig. 7.

Mounted on each of the four corners of the superstructure is a socket 49, similar to those on the trailer body except that they are longer and depend below the bottom to reach almost to the tops of the sockets on the trailer as is clearly indicated in Fig. 7, and each is provided with a clamp screw 50 which is located close to the bottom of the socket, the purpose being to keep the legs as short as possible and to prevent them extending above the top of the superstructure when the legs are raised for travel and used to clamp the superstructure against movement on the top of the trailer. A leg 51 is provided for each corner and slidably fits in the sockets 24 and 49 which are axially alignable, and each leg is preferably provided with a foot 52 to distribute the load over a greater area of the ground.

A conventional bed spring 53 and mattress 54 fit inside the superstructure, and together with suitable bedding is kept made up at all times so as to minimize the amount of work necessary when striking camp, and, by leaving the superstructure portion of the tent set up, with the balance of the tent folded over the top, ill or injured persons can readily be transported on the bed.

The tent is made up of suitable fabric such as canvas and consists of a partial side 55 having its lower end buttoned to the exterior of the superstructure as indicated at 56 and extending to the eave pole 38 to which it is preferably releasably attached as indicated at 57, thence continuing into a roof portion 58, over the ridge pole 41 to which it also is preferably releasably attached as indicated at 59 and to the eave pole 45 to which it is also releasably securable as indicated at 60, thence continuing down to the ground as indicated at 61, thence under the posts 43 or sill 44 and extending back therefrom to form the floor 62, thence up to the bottom of the trailer as indicated at 63, or, to the interior side of the superstructure if the trailer is to be removed, two rows of buttonholes being provided along with an additional length of fabric indicated at 64 to reach to the turnbuttons on the superstructure. At each lower end of the tent wall 63 and extending from the floor is an anchor flap 65 to be placed under the feet 52 to anchor that side of the floor. A rear wall 66 may be provided with a screened or flexiglass window as indicated, and the front wall 67 is provided with a suitable door or fly 68, the front and rear walls being integral with the roof and floor, the side wall 61 and the two partial side walls 55 and 63, with the superstructure forming the remainder of the tent.

In assembling this camp trailer, the superstructure is placed on top of the utility trailer, the legs 51 are slid into the sockets on the trailer and superstructure and adjusted and clamped to support the four corners, with all clamp screws tightened. This coincidently supports and securely locks the superstructure on the trailer so that there can be no relative movement in any direction.

The posts 36 and 39 with their eave and ridge poles are raised to their vertical position and locked by the struts 42. The tent is spread over the top and the lower edges of the trailer extension, partial side and partial front and back, are buttoned to the superstructure, and the tent roof secured by the ties 57 and 59 to the eave and ridge poles. The frame 43, 44, 45, if provided, is then set up, and the other end of the roof 58 is secured by the ties 60 to the eave pole 45. The bed is made up ready for occupancy.

The frame 36, 38 is folded down to the position indicated in Fig. 7, the front and back sections being coincidently tucked in, the side and roof being folded as indicated at 69. The frame 39, 41 is next folded down, with the free portions of the front and back being coincidently tucked in. The frame 43, 44, 45 and intervening portion of the roof, front, back, and other side of the tent are laid and folded on top, followed by the floor and remainder of the tent, being folded under and over to provide as neat and compact a unit as possible. A tarpaulin, not shown, may be stretched over the tent and buttoned around the superstructure if desired.

The outfit is made ready for transport to any desired locality by raising the legs and clamping all clamps as shown in Fig. 3. Fishing tackle, food stuffs, cooking utensils, camp stools, and other materials and equipment can be carried in the compartment between the bottom of the superstructure and the floor of the trailer.

When the destination is reached, the clamp screws are all released, allowing the legs to drop to the ground. The corners of the trailer are manually raised or depressed as may be necessary for leveling and the clamp screws tightened. The floor portion of the tent along with the frame 43, 44, 45 is taken off the top; the frames 36, 38, and 39, 41, are raised to their vertical position and secured by the struts. The legs 51 on the interior side of the trailer are then released, lifted slightly and the tabs 65 placed under them sequentially, the legs again lowered and clamped. The floor is then stretched, pegs 70 are driven and the guy ropes 71 slipped over the pegs and tightened. This draws the roof tight, and, if used, raises the frame 43, 44, 45 to a vertical position, making the tent ready for use.

The trailer and superstructure are easily arranged so that the trailer can be removed from the set-up tent at will, for use as a utility trailer for hauling wood, tools, supplies, or agricultural products, which will make the unit particularly useful for itinerant workers and convenient for sportsmen. This involves a modification only in the leg sockets on the trailer and of one leg socket on the superstructure.

As illustrated in Figs. 4 to 8, the leg sockets on the trailer are slotted rearward as indicated at 72 so that it can be moved diametrically forward off the leg 51, while only one front socket on the superstructure is slotted, but transversely or at right angles to the slots in the trailer sockets, as indicated at 73, and, the sockets must be mounted on the sides instead of front and back as shown in the other figures. With this arrangement, if the clamp screws are all released, the superstructure raised slightly to clear the top of the trailer, the three unslotted superstructure sockets clamped with all other clamp screws free, the trailer can be moved forward in the direction of the arrow 74, Fig. 5. The sockets on the trailer will leave the legs, with the trailer passing between; the leg can be removed from the slotted socket on the superstructure, thus freeing the trailer. The leg is replaced to support its corner of the superstructure. To replace the trailer, the leg is again removed, the trailer is backed part way into position, the leg replaced, the trailer moved back until the sockets engage the legs. The clamp screws on the superstructure sockets can be released to allow the superstructure to again rest on the trailer after tightening the clamp screws on the trailer sockets. Thus it is possible to pitch the tent, then remove the trailer and replace it at will without disturbing the set up tent.

I claim:

1. A trailer-tent combination comprising; a utility trailer; a superstructure releasably securable on said trailer, and supporting means manually operable for supporting said superstructure independently of said trailer; and a tent having eaves and a roof and including said superstructure, and supporting means for said tent comprising side posts and center posts collapsibly mounted on the respective sides at the respective ends of said superstructure for supporting one eave and the ridge of said tent; said utility trailer having sides opening respectively to raised and lowered positions horizontally to respectively function as a shelf, and as a seat and step, and means for supporting said sides in their open positions, and means for locking said sides in their closed positions.

2. A trailer-tent combination comprising; a utility trailer; a superstructure releasably securable on said trailer, and supporting means manually operable for supporting said superstructure independently of said trailer; and a tent having eaves and a roof and including said superstructure, and supporting means for said tent comprising side posts and center posts collapsibly mounted on the respective sides at the respective ends of said superstructure for supporting one eave and the ridge of said tent; said superstructure comprising an open-top box-like structure to rest on the top of said trailer and form a compartment between the bottom of said superstructure and the floor of said trailer, with the sides of the trailer openable respectively to raised and lowered horizontal positions to respectively form a shelf, and a seat or step, and provide access to said compartment.

3. A trailer-tent combination comprising; a utility trailer; a superstructure releasably securable on said trailer, and supporting means manually operable for supporting said superstructure independently of said trailer; and a tent having eaves and a roof and including said superstructure, and supporting means for said tent comprising side posts and center posts collapsibly mounted on the respective sides at the respective ends of said superstructure for supporting one eave and the ridge of said tent; said supporting means comprising a socket mounted adjacent each corner of said trailer and of said superstructure, with the sockets on the respective corners of the trailer and superstructure axially alignable, and clamping means for each socket; a leg for each corner and slidable through any of said sockets for four-corner support of said trailer and/or said superstructure, and selectively functioning in connection with said sockets and clamping means as supports and as aligning and securing means between said trailer and said superstructure.

4. A trailer-tent combination comprising; a utility trailer; a superstructure releasably securable on said trailer, and supporting means manually operable for supporting said superstructure independently of said trailer; and a tent having eaves and a roof and including said superstructure, and supporting means for said tent comprising side posts and center posts collapsibly mounted on the respective sides at the respective ends of said superstructure for supporting one eave and the ridge of said tent; said supporting means comprising a cylindrical socket rearwardly slotted and mounted on the sides adjacent each end of said trailer and having each a clamping device; a cylindrical socket mounted on one side adjacent each end and on the other side adjacent the rear end, and a side-slotted socket mounted adjacent the forward end of the other side of said superstructure, with the sockets at the respective ends and sides of the trailer and superstructure axially alignable; a cylindrical leg for each end of each side and axially slidable through said sockets, rearwardly removable through said slotted sockets on said trailer, and transversely removable through the slotted socket on said superstructure, to permit removal of said trailer from, and replacement to, said superstructure while maintaining support of said superstructure and tent by three of said legs.

5. A convertible camp and utility trailer and camp tent comprising; a vehicle, a tent, a superstructure forming a part of said tent; supporting and securing means for selectively removably supporting, aligning, and securing said superstructure on said vehicle, and independently supporting said superstructure in an elevated position to permit removal of said vehicle at will; and supporting means for the roof portion of said tent and supportable vertically by said superstructure; said vehicle having a body with side walls openable to horizontal positions and supporting means therefor; a compartment formed within said body by and between said superstructure and the floor of said body with the openable sides of said body providing access thereto; said supporting and securing means including a socket mounted adjacent each corner of said vehicle and clamping means for each socket; a leg member adjustable in each socket and securable in adjusted position through manual operation of said clamping means to support the respective corners of said vehicle; said superstructure having a socket including clamping means mounted adjacent each corner axially alignable with the sockets on said vehicle and each adjustably receiving said legs for supporting said superstructure independently of said vehicle.

6. A convertible camp and utility trailer and camp tent comprising; a vehicle, a tent, a superstructure forming a part of said tent; supporting and securing means for selectively removably supporting, aligning, and securing said superstructure on said vehicle, and independently supporting said superstructure in an elevated position to permit removal of said vehicle at will; and supporting means for the roof portion of said tent and supportable vertically by said superstructure; said supporting and securing means comprising a rearwardly slotted cylindrical socket located on a vertical axis adjacent each end on each side of said vehicle; a cylindrical socket mounted on each of three corners of said superstructure and a transversely slotted cylindrical socket mounted on the fourth corner of said superstructure and all axially alignable with said rearwardly slotted sockets; a cylindrical leg for each corner and axially adjustable in said sockets, and diametrically removable from said slotted sockets to permit removal of said vehicle from said superstructure and tent; and clamping means for each socket for clamping said legs in adjusted positions.

7. A convertible camp and utility trailer and camp tent comprising; a vehicle, a tent, a superstructure forming a part of said tent; supporting and securing means for selectively removably supporting, aligning, and securing said superstructure on said vehicle, and independently supporting said superstructure in an elevated position to permit removal of said vehicle at will; and supporting means for the roof portion of said tent and supportable vertically by said superstructure, said superstructure having a bottom, sides and ends to form a bed compartment and forming a storage compartment between said bottom and the floor of said vehicle; said supporting and securing means comprising a rearwardly slotted socket on each side adjacent each end of said vehicle; a transversely slotted socket on said superstructure adjacent one end and a cylindrical socket adjacent each of the other ends of said superstructure and axially alignable with the sockets on said vehicle; clamping means for each socket, and a leg for each corner and slidable through said sockets and diametrically removable through said slotted sockets, whereby said superstructure and vehicle are selectively, securable together and alignable for travel, are simultaneously supportable, or said superstructure is separately supportable, with said vehicle removable and replaceable at will, through the medium of said legs and clamping means in cooperation with said sockets.

8. A tent comprising a fabric enclosure having a roof, a partial floor, one side wall divided into two portions with one portion depending from one end of said roof to a spaced distance above the level of said partial floor and the other portion extending upwardly from the inner end of said partial floor substantially to the level of the lower end of said one portion, and a superstructure forming a bed compartment and filling the space between the respective lower and upper ends of the two portions to complete the enclosure, and supporting means for said superstructure, and tent posts supported by said superstructure and foldable therein together with the remainder of said enclosure; said superstructure having a bottom, and side and end walls; a trailer having a body with floor, side and end walls; alignable support and securing means for each corner of said trailer and superstructure and securable at will to function as securing means between the trailer and the superstructure, as supporting means for the trailer, and as supporting means for said superstructure independently of said trailer to permit removal and replacement of said trailer at will; said superstructure forming a storage compartment between the bottom thereof and the floor of said trailer, certain of said walls of said trailer being openable to provide access to said compartment.

9. A trailer having a body having bottom, and side and end walls, a superstructure having a bottom, side and end walls and mountable on said trailer, and means for alignably securing said superstructure on said trailer and when so secured forming a storage compartment within the trailer body with one of the side walls of said trailer openable to provide access to said compartment; said means for alignably securing said superstructure on said trailer including support means for selectively supporting the four corners, of said trailer, of said superstructure, or, of said trailer and said superstructure; tent posts hingedly mounted in said superstructure, and a tent in which said superstructure forms a portion thereof to form a complete enclosure.

THEODORE HEIL.